(12) United States Patent
Matlin

(10) Patent No.: US 7,661,614 B2
(45) Date of Patent: *Feb. 16, 2010

(54) SHREDDER THROAT SAFETY SYSTEM

(75) Inventor: Tai Hoon Kim Matlin, Round Lake Beach, IL (US)

(73) Assignee: Fellowes Inc., Itasca, IL (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/177,480

(22) Filed: Jul. 11, 2005

(65) Prior Publication Data

US 2006/0054725 A1  Mar. 16, 2006
US 2008/0105772 A2  May 8, 2008

Related U.S. Application Data

(63) Continuation-in-part of application No. 10/937,304, filed on Sep. 10, 2004, now Pat. No. 7,311,276.

(51) Int. Cl.
*A01F 21/00* (2006.01)
*B23Q 11/00* (2006.01)

(52) U.S. Cl. .................. 241/37.5; 241/101.2; 241/236

(58) Field of Classification Search .......... 241/100, 241/101.2, 236, 37.5
See application file for complete search history.

(56) References Cited

U.S. PATENT DOCUMENTS

| | | |
|---|---|---|
| 3,619,537 A | 11/1971 | Nara et al. |
| 3,764,819 A | 10/1973 | Muller |
| 3,785,230 A | 1/1974 | Lokey |
| 3,829,850 A | 8/1974 | Guetersloh |
| 3,947,734 A | 3/1976 | Fyler |
| 4,352,980 A | 10/1982 | Hibari |
| 4,489,897 A | 12/1984 | Turner |
| 4,497,478 A | 2/1985 | Reschenhofer |
| 4,683,381 A | 7/1987 | Dufoug |
| 4,707,704 A | 11/1987 | Allen |
| 4,757,949 A | 7/1988 | Horton |
| 4,814,632 A | 3/1989 | Glaeser |
| 4,914,721 A | 4/1990 | Glaeser |
| 5,017,972 A | 5/1991 | Daughton |
| 5,081,406 A | 1/1992 | Hughes et al. |
| 5,166,679 A | 11/1992 | Vranish et al. |

(Continued)

FOREIGN PATENT DOCUMENTS

DE    33 13 232    10/1984

(Continued)

OTHER PUBLICATIONS

International Search Report and Written Opinion for PCT/US2005/028290 dated Nov. 21, 2005.

(Continued)

*Primary Examiner*—Bena Miller
(74) *Attorney, Agent, or Firm*—Pillsbury Winthrop Shaw Pittman LLP

(57) ABSTRACT

The present invention relates to a shredder that includes a housing having a movable part that forms at least a part of an opening for the insertion of articles to be fed into the shredder. A detector detects motion of the movable part, and in response, a controller performs a predetermined operation, including, for example, stopping cutting elements of the shredder mechanism.

53 Claims, 13 Drawing Sheets

U.S. PATENT DOCUMENTS

| | | | |
|---|---|---|---|
| 5,186,398 | A | 2/1993 | Vigneau, Jr. |
| 5,342,033 | A | 8/1994 | Iwata |
| 5,345,138 | A | 9/1994 | Mukaidono et al. |
| 5,353,468 | A | 10/1994 | Yap |
| 5,397,890 | A | 3/1995 | Schueler et al. |
| 5,415,355 | A | 5/1995 | Gollwitzer |
| 5,429,313 | A | 7/1995 | Schwelling |
| 5,436,613 | A * | 7/1995 | Ghosh et al. ............. 340/573.1 |
| 5,453,644 | A | 9/1995 | Yap |
| 5,494,229 | A | 2/1996 | Rokos |
| 5,823,529 | A | 10/1998 | Mandel |
| 5,850,342 | A | 12/1998 | Nakamura et al. |
| 5,924,637 | A | 7/1999 | Niederholtmeyer |
| D412,716 | S | 8/1999 | Kroger |
| 5,942,975 | A | 8/1999 | Sorenson |
| D414,198 | S | 9/1999 | Iwata |
| 5,988,542 | A | 11/1999 | Henreckson |
| 6,065,696 | A | 5/2000 | Tsai |
| D426,805 | S | 6/2000 | Iwata |
| 6,079,645 | A * | 6/2000 | Henreckson et al. ....... 241/37.5 |
| 6,116,528 | A | 9/2000 | Schwelling |
| 6,265,682 | B1 | 7/2001 | Lee |
| 6,376,939 | B1 | 4/2002 | Suzuki et al. |
| 6,418,004 | B1 | 7/2002 | Mather et al. |
| 6,655,943 | B1 | 12/2003 | Peterson |
| 6,676,460 | B1 | 1/2004 | Motsenbocker |
| 6,698,640 | B2 | 3/2004 | Hakozaki |
| 6,724,324 | B1 * | 4/2004 | Lambert ...................... 341/33 |
| 6,813,983 | B2 | 11/2004 | Gass et al. |
| 6,826,988 | B2 | 12/2004 | Gass |
| 6,857,345 | B2 | 2/2005 | Gass |
| 6,877,410 | B2 | 4/2005 | Gass et al. |
| 6,880,440 | B2 | 4/2005 | Gass et al. |
| 6,920,814 | B2 | 7/2005 | Gass et al. |
| 6,979,813 | B2 | 12/2005 | Avril |
| 7,040,559 | B2 | 5/2006 | Matlin |
| 7,166,561 | B2 | 1/2007 | Allen |
| 2002/0017175 | A1 | 2/2002 | Gass et al. |
| 2002/0017176 | A1 | 2/2002 | Gass et al. |
| 2002/0017178 | A1 | 2/2002 | Gass et al. |
| 2002/0017179 | A1 | 2/2002 | Gass et al. |
| 2002/0017180 | A1 | 2/2002 | Gass et al. |
| 2002/0017181 | A1 | 2/2002 | Gass et al. |
| 2002/0017182 | A1 | 2/2002 | Gass et al. |
| 2002/0017183 | A1 | 2/2002 | Gass |
| 2002/0017184 | A1 | 2/2002 | Gass et al. |
| 2002/0017336 | A1 | 2/2002 | Gass et al. |
| 2002/0020261 | A1 | 2/2002 | Gass et al. |
| 2002/0020262 | A1 | 2/2002 | Gass et al. |
| 2002/0020263 | A1 | 2/2002 | Gass et al. |
| 2002/0020265 | A1 | 2/2002 | Gass et al. |
| 2002/0020271 | A1 | 2/2002 | Gass et al. |
| 2002/0056348 | A1 | 5/2002 | Gass et al. |
| 2002/0056349 | A1 | 5/2002 | Gass et al. |
| 2002/0056350 | A1 | 5/2002 | Gass et al. |
| 2002/0059853 | A1 | 5/2002 | Gass et al. |
| 2002/0059854 | A1 | 5/2002 | Gass et al. |
| 2002/0059855 | A1 | 5/2002 | Gass et al. |
| 2002/0066346 | A1 | 6/2002 | Gass et al. |
| 2002/0069734 | A1 | 6/2002 | Gass et al. |
| 2002/0170399 | A1 | 11/2002 | Gass et al. |
| 2002/0170400 | A1 | 11/2002 | Gass |
| 2002/0190581 | A1 | 12/2002 | Gass et al. |
| 2003/0002942 | A1 | 1/2003 | Gass et al. |
| 2003/0005588 | A1 | 1/2003 | Gass et al. |
| 2003/0015253 | A1 | 1/2003 | Gass et al. |
| 2003/0019341 | A1 | 1/2003 | Gass et al. |
| 2003/0020336 | A1 | 1/2003 | Gass et al. |
| 2003/0037651 | A1 | 2/2003 | Gass et al. |
| 2003/0056853 | A1 | 3/2003 | Gass et al. |
| 2003/0058121 | A1 | 3/2003 | Gass et al. |
| 2003/0090224 | A1 | 5/2003 | Gass et al. |
| 2003/0117023 | A1 | 6/2003 | Avril |
| 2003/0131703 | A1 | 7/2003 | Gass et al. |
| 2003/0140749 | A1 | 7/2003 | Gass et al. |
| 2003/0196824 | A1 | 10/2003 | Gass et al. |
| 2004/0008122 | A1 | 1/2004 | Michael |
| 2004/0040426 | A1 | 3/2004 | Gass et al. |
| 2004/0069883 | A1 * | 4/2004 | Watanabe et al. ........... 241/236 |
| 2004/0159198 | A1 | 8/2004 | Peot et al. |
| 2004/0163514 | A1 | 8/2004 | Gass et al. |
| 2004/0173430 | A1 | 9/2004 | Gass |
| 2004/0194594 | A1 | 10/2004 | Dils et al. |
| 2004/0226800 | A1 | 11/2004 | Pierga et al. |
| 2005/0039586 | A1 | 2/2005 | Gass et al. |
| 2005/0039822 | A1 | 2/2005 | Gass et al. |
| 2005/0041359 | A1 | 2/2005 | Gass |
| 2005/0066784 | A1 | 3/2005 | Gass |
| 2005/0103510 | A1 | 5/2005 | Gass et al. |
| 2005/0139051 | A1 | 6/2005 | Gass et al. |
| 2005/0139056 | A1 | 6/2005 | Gass et al. |
| 2005/0139057 | A1 | 6/2005 | Gass et al. |
| 2005/0139058 | A1 | 6/2005 | Gass et al. |
| 2005/0139459 | A1 | 6/2005 | Gass et al. |
| 2005/0150986 | A1 | 7/2005 | Castronovo |
| 2005/0155473 | A1 | 7/2005 | Gass |
| 2005/0166736 | A1 | 8/2005 | Gass et al. |
| 2006/0016919 | A1 | 1/2006 | Castronovo |
| 2006/0091247 | A1 | 5/2006 | Matlin |
| 2006/0243631 | A1 | 11/2006 | Duke |
| 2007/0080252 | A1 | 4/2007 | Pierce |
| 2007/0087942 | A1 | 4/2007 | Allen |
| 2007/0164135 | A1 | 7/2007 | Zhong |
| 2007/0164138 | A1 | 7/2007 | Allen |
| 2007/0215728 | A1 | 9/2007 | Priester |
| 2009/0032629 | A1 | 2/2009 | Aries et al. |

FOREIGN PATENT DOCUMENTS

| | | |
|---|---|---|
| DE | 8619856.4 | 7/1986 |
| DE | 86 19 856.4 | 10/1988 |
| DE | 41 21 330 | 1/1993 |
| DE | 198 35 093 A1 | 2/1999 |
| DE | 20 2004 000 907 | 5/2005 |
| DE | 102006036136 A1 | 1/2008 |
| EP | 268.244 | 11/1987 |
| EP | 562076 | 9/1992 |
| EP | 524708 | 1/1997 |
| EP | 856945 | 1/1998 |
| EP | 855 221 | 7/1998 |
| EP | 2 022 566 A2 | 2/2009 |
| GB | 1199903 | 7/1970 |
| GB | 2 171 029 | 8/1986 |
| GB | 2 440 651 A | 2/2008 |
| JP | 52-11691 | 1/1977 |
| JP | 57-76734 | 5/1982 |
| JP | 04-157093 | 5/1992 |
| JP | 040180852 | 6/1992 |
| JP | 6-277548 | 10/1994 |
| JP | 7-299377 | 11/1995 |
| JP | 09-150069 | 10/1997 |
| JP | 9-262491 | 10/1997 |
| JP | 10-048344 | 2/1998 |
| JP | 11-216383 | 8/1999 |
| JP | 11-304942 | 11/1999 |
| JP | 20000346288 | 12/2000 |
| JP | 2002-239405 | 8/2002 |
| JP | 2002239405 | 8/2002 |
| JP | 2004321993 | 11/2004 |
| WO | 2005070553 | 8/2005 |
| WO | 2006/036370 | 4/2006 |
| WO | 2007/109753 A2 | 9/2007 |

WO 2007/122364 11/2007

OTHER PUBLICATIONS

SEM Advertisement for LK-3 Automatic Oiling System.
Advertisement for Auto-Lube.
1st Paper Shredder—Advertisement for DAHLE Automatic Oiler/Paper Shredder Oiling Accessory.
nstructions for Installing a Shredder Oiling System from www.compax.com.
Full-Size Picture of Shredder with LK-3 Oiling System.
Picture of Unknown Shredder with Oil Container on Side.
International Search Report (PCT/ISA/210) issued in PCT/US2007/064601, mailed Feb. 8, 2008, 5 pages.
Written Opinion of the International Searching Authority (PCT/ISA/237) issued in PCT/US2007/0064601, mailed Feb. 8, 2008, 16 pages.
European Search Report issued in related international application No. 08102126.3, May 7, 2008, 5 pages.
Request for Ex Parte Reexamination filed in U.S. patent 7,311,276 on Jul. 30, 2008.
U.S. Appl. No. 60/686,490, Pierce.
U.S. Appl. No. 60/613,750, Pierce.
U.S. Appl. No. 60/688,285, Pierce.
Invitation to Pay Additional Fees with Partial International Search Report in PCT/US2007/064601, Sep. 12, 2007, 8 pages.
TI's Digital Signal Controllers Put Brake On SawStop Table Saw, Feb. 9, 2005, pp. 1-3 (printed from www.embeddedstar.com/press/content/2005/2/embedded17827.html).
Partial International Search Report issued with Invitation to Pay Additional Fees issued in PCT/US2008/078458, Jan. 26, 2009, 2 pages.

European Search Report issued in application No. 08170857.0, Feb. 10, 2009, 6 pages.
Notification of Transmittal of International Search Report, Search Report and Written Opinion of the International Searching Authority issued in PCT/US2008/078458, Mar. 30, 2009, 21 pages.
Examination Report for Australian Patent Application No. 2008202504, mailed Mar. 13, 2009.
Office Action for Chinese Patent Application No. 200580034478.5, mailed Apr. 10, 2009.
Judgment regarding Appeal No. 2000-26479 for Japanese Patent Application No. 2005-261612, dated Apr. 6, 2009.
Notice of Allowance for Russian Patent Application No. 2007108715, dated May 6, 2009.
International Preliminary Report on Patentability for PCT/US2005/028290, mailed Oct. 22, 2008.
International Preliminary Report on Patentability for PCT/US2007/064601, mailed Sep. 23, 2008.
Examination Report for European Patent Application No. 08102126.3, mailed Mar. 4, 2009.
Examination Report for Australian Patent Application No. 2005285398, mailed Feb. 22, 2008.
Notice of Acceptance for Australian Patent Application No. 2005285398, mailed Apr. 15, 2008.
Examination Report for Australian Patent Application No. 2008100182, mailed Jul. 7, 2008.
Office Action for Canadian Patent Application No. 2,579,137, mailed on May 21, 2009.
Examination Report for European Patent Application No. 05784240.3, mailed on Mar. 31, 2008.

* cited by examiner

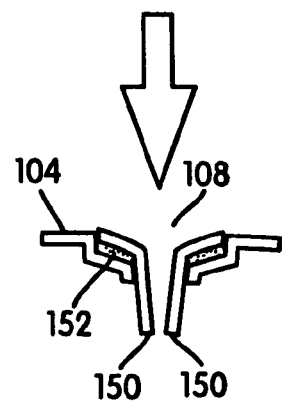
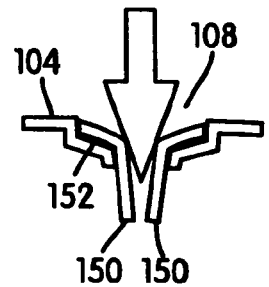
FIG. 10a    FIG. 10b
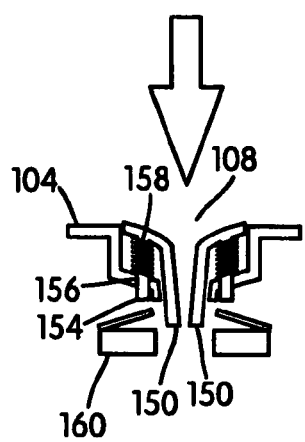
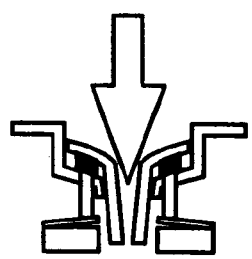
FIG. 11a    FIG. 11b

SHREDDER THROAT SAFETY SYSTEM

This application is a continuation-in-part of U.S. patent application Ser. No. 10/937,304, filed Sep. 10, 2004, now U.S. Pat. No. 7,311,276 and claims priority thereto, that application is incorporated herein by reference in its entirety.

FIELD OF THE INVENTION

The present invention relates to shredders for destroying articles, such as documents, CDs, etc.

BACKGROUND OF THE INVENTION

Shredders are well known devices for destroying articles, such as documents, CDs, floppy disks, etc. Typically, users purchase shredders to destroy sensitive articles, such as credit card statements with account information, documents containing company trade secrets, etc.

A common type of shredder has a shredder mechanism contained within a housing that is removably mounted atop a container. The shredder mechanism typically has a series of cutter elements that shred articles fed therein and discharge the shredded articles downwardly into the container. It is generally desirable to prevent a person's or animal's body part from contacting these cutter elements during the shredding operation.

The present invention endeavors to provide various improvements over known shredders.

SUMMARY OF THE INVENTION

One aspect of the present invention provides a shredder comprising a housing, a shredder mechanism including a motor and cutter elements, a proximity sensor, and a controller. The shredder mechanism enables articles to be shredded to be fed into the cutter elements, and the motor is operable to drive the cutter elements so that the cutter elements shred the articles fed therein.

The housing has an opening enabling articles to be fed therethrough into the cutter elements of the shredder mechanism for shredding. The proximity sensor is located adjacent the opening and configured to indicate the presence of a person or animal in proximity to the opening. The controller is operable to perform a predetermined operation (e.g., to disable the shredder mechanism) responsive to the indicated presence of the person or animal.

Another aspect of the invention provides a shredder with a proximity sensor that includes an electroconductive element and circuitry to sense a state of the electroconductive element. The proximity sensor is configured to indicate a change in the state of the electroconductive element corresponding to a change in capacitance caused by a person or animal approaching in proximity to the electroconductive element. A controller of the shredder is operable to perform a predetermined operation responsive to the indicated change in the state of the electroconductive element.

Another aspect of the invention provides a shredder having a housing, a shredder mechanism received in the housing and including an electrically powered motor and cutter elements, the shredder mechanism enabling articles to be shredded to be fed into the cutter elements and the motor being operable to drive the cutter elements so that the cutter elements shred the articles fed therein, the housing having a movable part providing at least part of an opening enabling articles to be fed therethrough into the cutter elements of the shredder mechanism for shredding, the movable part being movable from a first position to a second position and being biased to the first position, a detector configured to detect movement of the movable part to the second position, the movable part being constructed to move from the first position to the second position upon a user attempting to force an article having a thickness greater than a predetermined thickness through the opening, and a controller operable to perform a predetermined operation responsive to the detector detecting that the movable part has moved to the second position.

Other objects, features, and advantages of the present invention will become apparent from the following detailed description, the accompanying drawings, and the appended claims.

BRIEF DESCRIPTION OF THE DRAWINGS

FIGS. 10a and 10b are cross-sectional views showing a shredder opening having a pressure-sensitive switch in accordance with embodiments of the present invention.

FIGS. 11a and 11b are cross-sectional views showing a shredder opening having an alternate pressure-sensitive switch in accordance with embodiments of the present invention;

DETAILED DESCRIPTION OF THE ILLUSTRATED EMBODIMENTS

Figure 1:
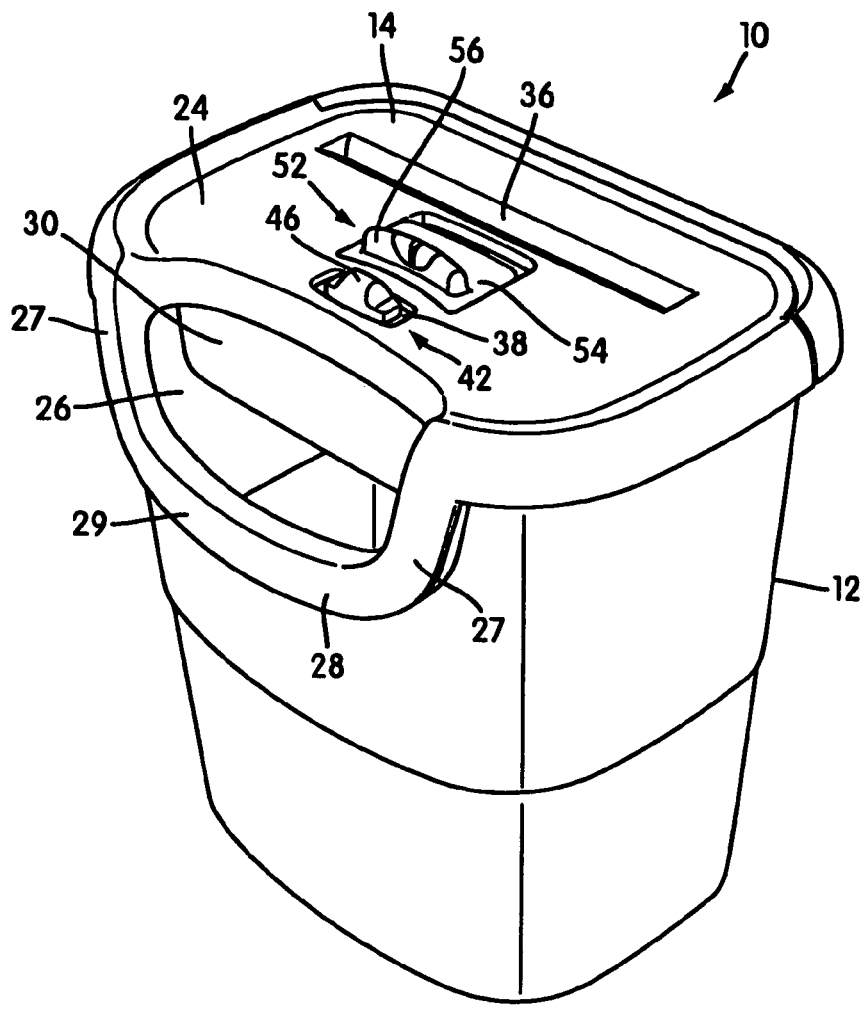
FIG. 1 is a perspective view of a shredder constructed in accordance with an embodiment of the present invention.
Figure 2:
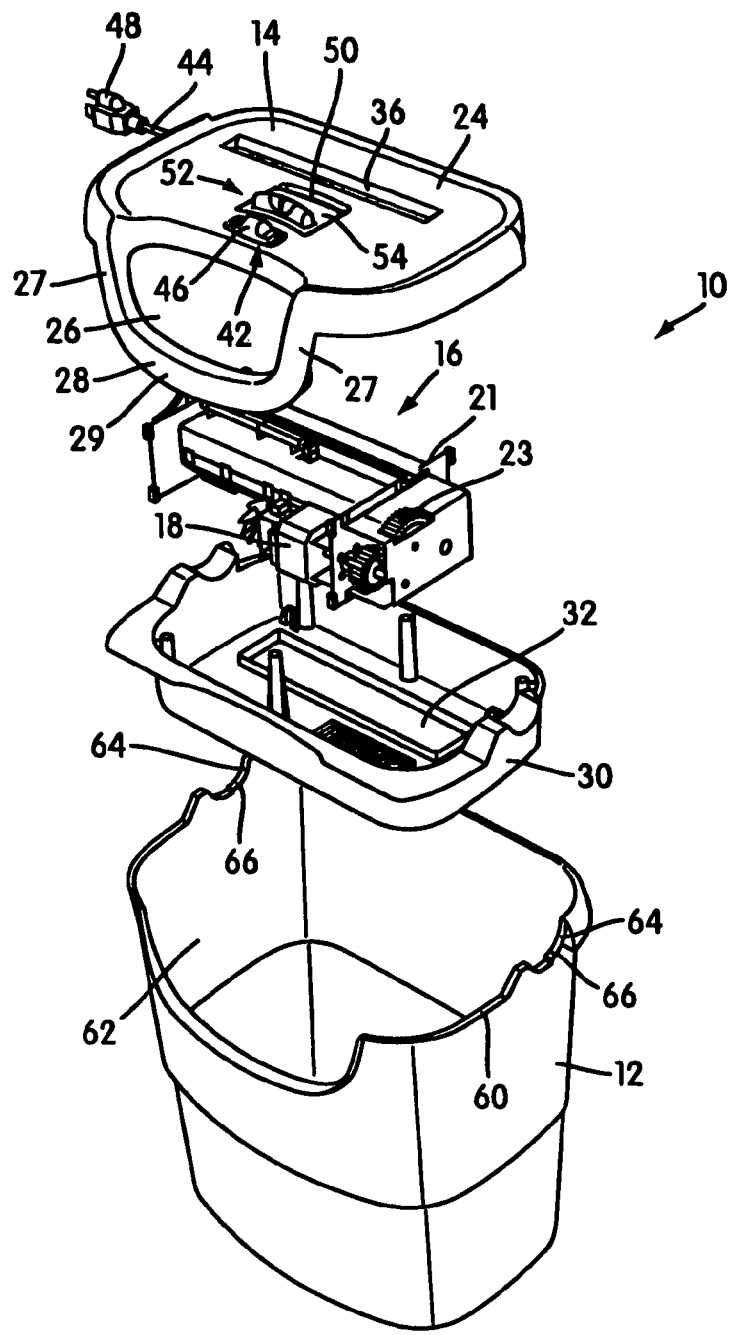
FIG. 2 is an exploded perspective view of the shredder of FIG. 1.

FIGS. 1 and 2 illustrate a shredder constructed in accordance with an embodiment of the present invention. The shredder is generally indicated at 10. The shredder 10 sits atop a waste container, generally indicated at 12, which is formed of molded plastic or any other material. The shredder 10 illustrated is designed specifically for use with the container 12, as the shredder housing 14 sits on the upper periphery of the waste container 12 in a nested relation. However, the shredder 10 may also be designed so as to sit atop a wide variety of standard waste containers, and the shredder 10 would not be sold with the container. Likewise, the shredder 10 could be part of a large freestanding housing, and a waste container would be enclosed in the housing. An access door would provide for access to and removal of the container. Generally speaking, the shredder 10 may have any suitable construction or configuration and the illustrated embodiment is not intended to be limiting in any way.

The shredder 10 includes a shredder mechanism 16 including an electrically powered motor 18 and a plurality of cutter elements (not shown). "Shredder mechanism" is a generic structural term to denote a device that shreds articles using cutter elements. Such shredding may be done in any particular way. The cutter elements are generally mounted on a pair of parallel rotating shafts (not shown). The motor 18 operates using electrical power to rotatably drive the shafts and the cutter elements through a conventional transmission 23 so that the cutter elements shred articles fed therein. The shredder mechanism 16 may also include a sub-frame 21 for mounting the shafts, the motor 18, and the transmission 23. The operation and construction of such a shredder mechanism 16 are well known and need not be described herein in detail. Generally, any suitable shredder mechanism 16 known in the art or developed hereafter may be used.

The shredder 10 also includes the shredder housing 14, mentioned above. The shredder housing 14 includes top wall 24 that sits atop the container 12. The top wall 14 is molded from plastic and an opening 26 is located at a front portion thereof. The opening 26 is formed in part by a downwardly depending generally U-shaped member 28. The U-shaped member 28 has a pair of spaced apart connector portions 27 on opposing sides thereof and a hand grip portion 28 extending between the connector portions 27 in spaced apart relation from the housing 14. The opening 26 allows waste to be discarded into the container 12 without being passed through the shredder mechanism 16, and the member 28 may act as a handle for carrying the shredder 10 separate from the container 12. As an optional feature, this opening 26 may be provided with a lid, such as a pivoting lid, that opens and closes the opening 26. However, this opening in general is optional and may be omitted entirely. Moreover, the shredder housing 14 and its top wall 24 may have any suitable construction or configuration.

The shredder housing 14 also includes a bottom receptacle 30 having a bottom wall, four side walls and an open top. The shredder mechanism 16 is received therein, and the receptacle 30 is affixed to the underside of the top wall 24 by fasteners. The receptacle 30 has an opening 32 in its bottom wall through which the shredder mechanism 16 discharges shredded articles into the container 12.

The top wall 24 has a generally laterally extending opening 36 extending generally parallel and above the cutter elements. The opening 36, often referred to as a throat, enables the articles being shredded to be fed into the cutter elements. As can be appreciated, the opening 36 is relatively narrow, which is desirable for preventing overly thick items, such as large stacks of documents, from being fed into cutter elements, which could lead to jamming. The opening 36 may have any configuration.

The top wall 24 also has a switch recess 38 with an opening therethrough. An on/off switch 42 includes a switch module (not shown) mounted to the top wall 24 underneath the recess 38 by fasteners, and a manually engageable portion 46 that moves laterally within the recess 38. The switch module has a movable element (not shown) that connects to the manually engageable portion 46 through the opening 40. This enables movement of the manually engageable portion 46 to move the switch module between its states.

In the illustrated embodiment, the switch module connects the motor 18 to the power supply (not shown). Typically, the power supply will be a standard power cord 44 with a plug 48 on its end that plugs into a standard AC outlet. The switch 42 is movable between an on position and an off position by moving the portion 46 laterally within the recess 38. In the on position, contacts in the switch module are closed by movement of the manually engageable portion 46 and the movable element to enable a delivery of electrical power to the motor 18. In the off position, contacts in the switch module are opened to disable the delivery of electric power to the motor 18.

As an option, the switch 42 may also have a reverse position wherein contacts are closed to enable delivery of electrical power to operate the motor 18 in a reverse manner. This would be done by using a reversible motor and applying a current that is of a reverse polarity relative to the on position. The capability to operate the motor 18 in a reversing manner is desirable to move the cutter elements in a reversing direction for clearing jams. In the illustrated embodiment, in the off position the manually engageable portion 46 and the movable element would be located generally in the center of the recess 38, and the on and reverse positions would be on opposing lateral sides of the off position.

Generally, the construction and operation of the switch 42 for controlling the motor 42 are well known and any construction for such a switch 42 may be used.

The top cover 24 also includes another recess 50 associated with a switch lock 52. The switch lock 52 includes a manually engageable portion 54 that is movable by a user's hand and a locking portion (not shown). The manually engageable portion 54 is seated in the recess 50 and the locking portion is located beneath the top wall 24. The locking portion is integrally formed as a plastic piece with the manually engageable portion 54 and extends beneath the top wall 24 via an opening formed in the recess 50.

The switch lock 52 causes the switch 42 to move from either its on position or reverse position to its off position by a camming action as the switch lock 52 is moved from a releasing position to a locking position. In the releasing position, the locking portion is disengaged from the movable element of the switch 42, thus enabling the switch 42 to be moved between its on, off, and reverse positions. In the locking position, the movable element of the switch 42 is restrained in its off position against movement to either its on or reverse position by the locking portion of the switch lock 52.

Preferably, but not necessarily, the manually engageable portion 54 of the switch lock 52 has an upwardly extending projection 56 for facilitating movement of the switch lock 52 between the locking and releasing positions.

One advantage of the switch lock 52 is that, by holding the switch 42 in the off position, to activate the shredder mechanism 16 the switch lock 52 must first be moved to its releasing position, and then the switch 42 is moved to its on or reverse position. This reduces the likelihood of the shredder mechanism 16 being activated unintentionally.

In the illustrated embodiment, the shredder housing 14 is designed specifically for use with the container 12 and it is intended to sell them together. The upper peripheral edge 60 of the container 12 defines an upwardly facing opening 62, and provides a seat 61 on which the shredder 10 is removably mounted. The seat 61 includes a pair of pivot guides 64 provided on opposing lateral sides thereof. The pivot guides 64 include upwardly facing recesses 66 that are defined by walls extending laterally outwardly from the upper edge 60 of the container 12. The walls defining the recesses 66 are molded integrally from plastic with the container 12, but may be provided as separate structures and formed from any other material. At the bottom of each recess 66 is provided a step down or ledge providing a generally vertical engagement surface 68. This step down or ledge is created by two sections of the recesses 66 being provided with different radii.

The shredder 10 has a proximity sensor to detect the presence of a person or thing (e.g., animal or inanimate object) in proximity to the opening 36. A person or thing is "in proximity" to the opening 36 when a part thereof is outside and adjacent to the opening 36 or at least partially within the opening 36. The proximity sensor may be implemented in various ways, such as is described in further detail below. For further examples of shredders on which a proximity sensor may be used, reference may be made to U.S. patent application Ser. Nos. 10/828,254 (filed Apr. 21, 2004), 10/815,761 (filed Apr. 2, 2004), and 10/347,700 (filed Jan. 22, 2003), each of which is hereby incorporated into the present application by reference. Generally, the proximity sensor may be used with any type of shredder, and the examples identified herein are not intended to be limiting.

Figure 3:
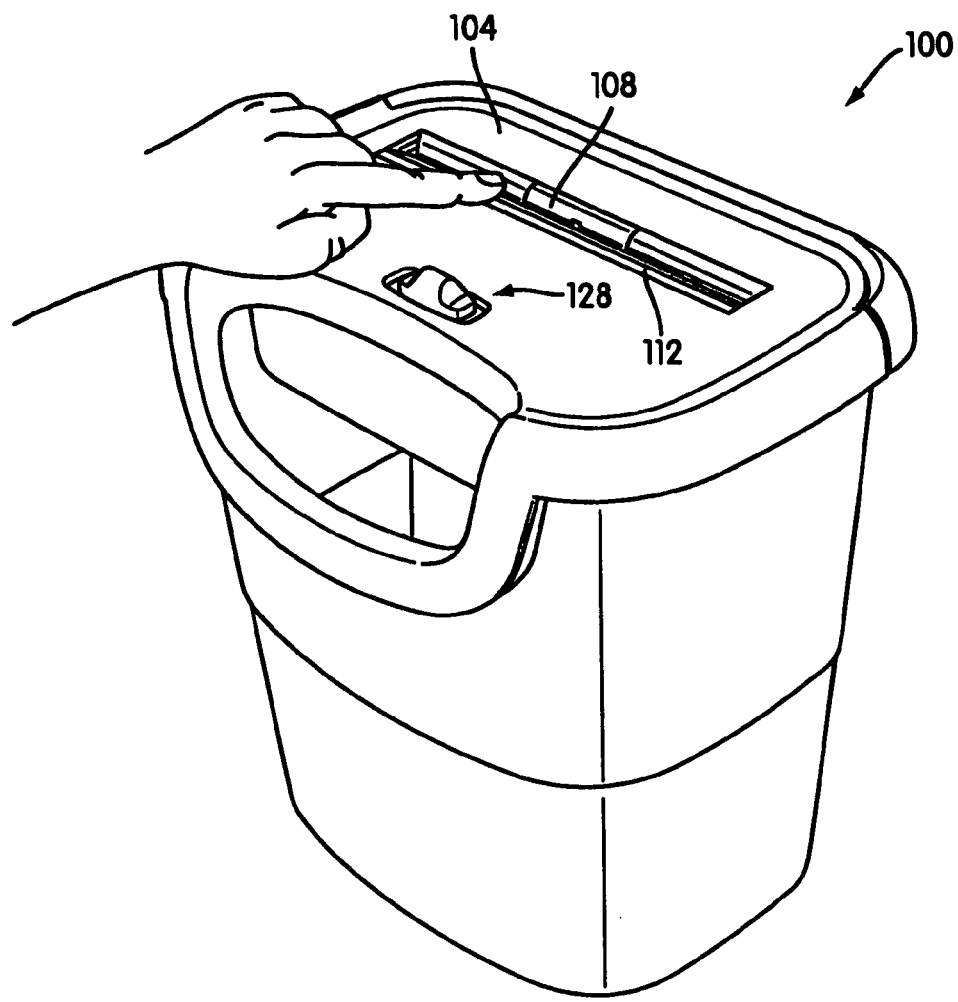
FIG. 3 is a perspective view of a shredder constructed in accordance with an embodiment of the present invention.

FIG. 3 is a perspective view of a shredder 100 constructed in accordance with an embodiment of the present invention. The shredder 100 incorporates a capacitive sensor. The illustrated capacitive sensor is a switch that detects the presence of a person or thing without requiring physical contact. The capacitive sensor includes a conductor/contact plate 112 connected to a circuit, such as those shown in FIGS. 8 and 9. The conductor 112 serves as the first plate of a capacitor, while the person or thing to be detected serves as the second plate thereof. As the distance between the conductor 112 and the person or thing decreases, the mutual capacitance therebetween increases. This increase in capacitance results in increased signal levels in the sensor, which levels can be used to detect the proximity of the person or thing.

It is to be appreciated that capacitance depends in part on the dielectric constant of the second plate of a capacitor. A higher dielectric constant translates into a larger capacitance. Therefore, the capacitive sensor of the shredder 100 can detect the proximity of a nearby animate or inanimate entity provided that its respective dielectric constant is sufficiently high. Because human beings and various animals have relatively high dielectric constants, they are detectable by the capacitive sensor. Inanimate objects with relatively high dielectric constants also are detectable. Conversely, objects with low or moderate dielectric constants, such as paper, are not detectable.

The shredder 100 includes a shredder housing 104, an opening 108, and a control switch 128 with on, off, and reverse positions. A shredder mechanism, such as the one described above, is located beneath the opening 108 so that documents can be fed into the shredder mechanism through the opening 108.

The conductor 112 can be, for example, a strip of metal, foil tape (e.g., copper tape), conductive paint, a silk-screened conductive ink pattern, or another suitable conductive material. As shown in FIG. 3, the conductor 112 is a 9-inch by 1-inch capacitive sensing strip that is affixed to the housing 104 near the opening 108. As such, when a person or thing nears the opening 108 and thus the cutter elements of the shredding mechanism of the shredder 100, the capacitance between the conductor 112 and the person or thing increases, resulting in an increase in the signal level used for detection, as will be described below. To ensure that the switch is sensitive enough to detect the person or thing through multiple sheets of paper, the conductor 112 extends into the opening 108 to increase the overall surface area of the conductor 112 and thus the amount of capacitance between the conductor 112 and the nearby person or thing. The conductor 112 optionally can be covered by non-conductive plastic, for example, thus concealing the switch from a user of the shredder 100. In addition, to increase sensitivity of the switch, such non-conductive plastic can be covered with a conductive material, such as metal foil.

Though not illustrated in FIG. 3, the shredder 100 can include a sensor light, an error light, and/or a light indicative of normal operation. The sensor light, which can be an LED, is illuminated when a person or thing is detected. The error light, which also can be an LED, is illuminated when a person or thing is detected, and optionally under other conditions (e.g., the shredder container is not properly engaged with the shredder 100, or the shredder mechanism has become jammed). These lights, however, are not necessary, and are only optional features.

FIGS. 4-7 are cross-sectional views each showing a shredder housing 104, opening 108, cutting elements 132, and a conductor configuration for a sensor in accordance with various embodiments of the present invention. The conductor configurations can include conductor(s) of different areas to tailor the amount of capacitance and thus the signal level produced when a person or thing nears the shredder. Where multiple conductors are employed, the distance therebetween may be designed also to tailor the amount of capacitive coupling and thus the capacitance produced.

Figure 4:
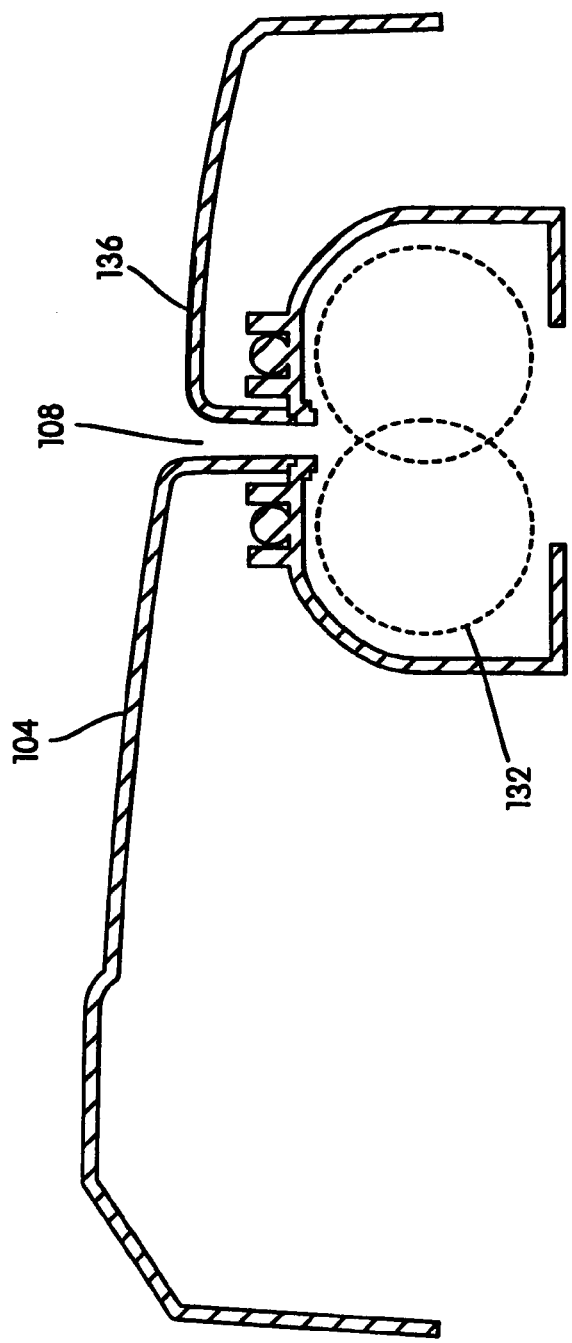
FIGS. 4-7 are cross-sectional views each showing a shredder housing, opening, cutting elements, and conductor configuration for a sensor in accordance with various embodiments of the present invention.

In FIG. 4, the conductor 136 comprises a conductive material embedded within the upper wall of the housing 104 beneath the upper surface partially into the opening 108. The conductor 136 also is optionally embedded in the wall defining the opening 108 and extends along it for a portion.

Figure 5:
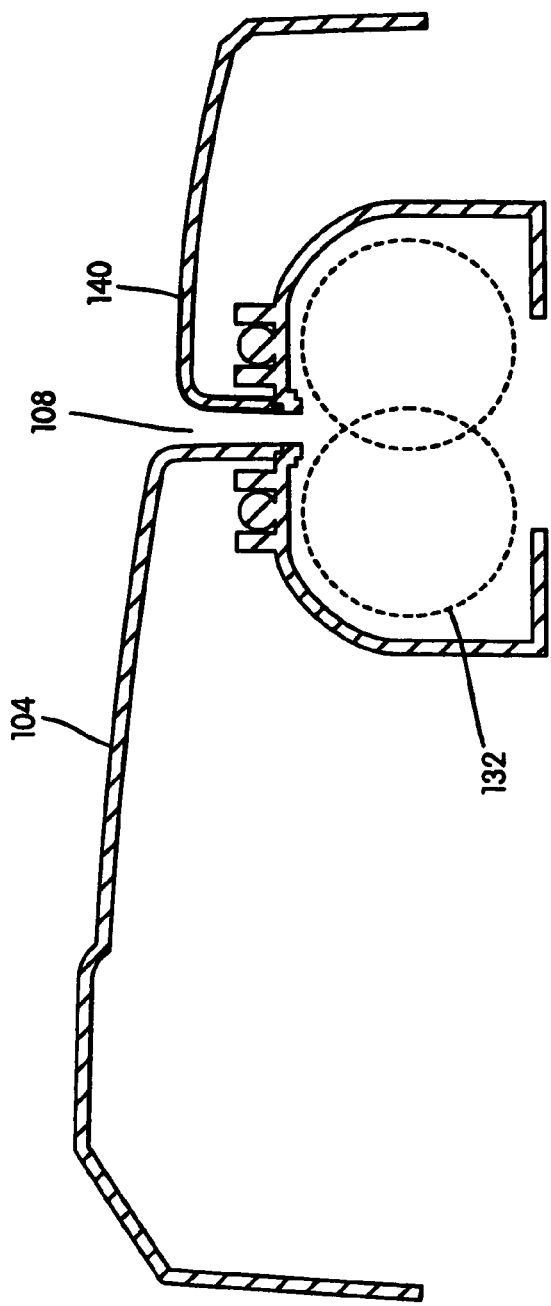

In FIG. 5, the conductive material of the conductor 140 covers an upper surface portion of the housing 104, extends substantially into the opening 108, and curves around a Range of the housing 104 so as to cover an inside surface portion of the housing 104. For a conductor 140 that has a noticeable amount of thickness, the top portion of the upper surface where the conductor 140 is mounted may be recessed.

Figure 6:
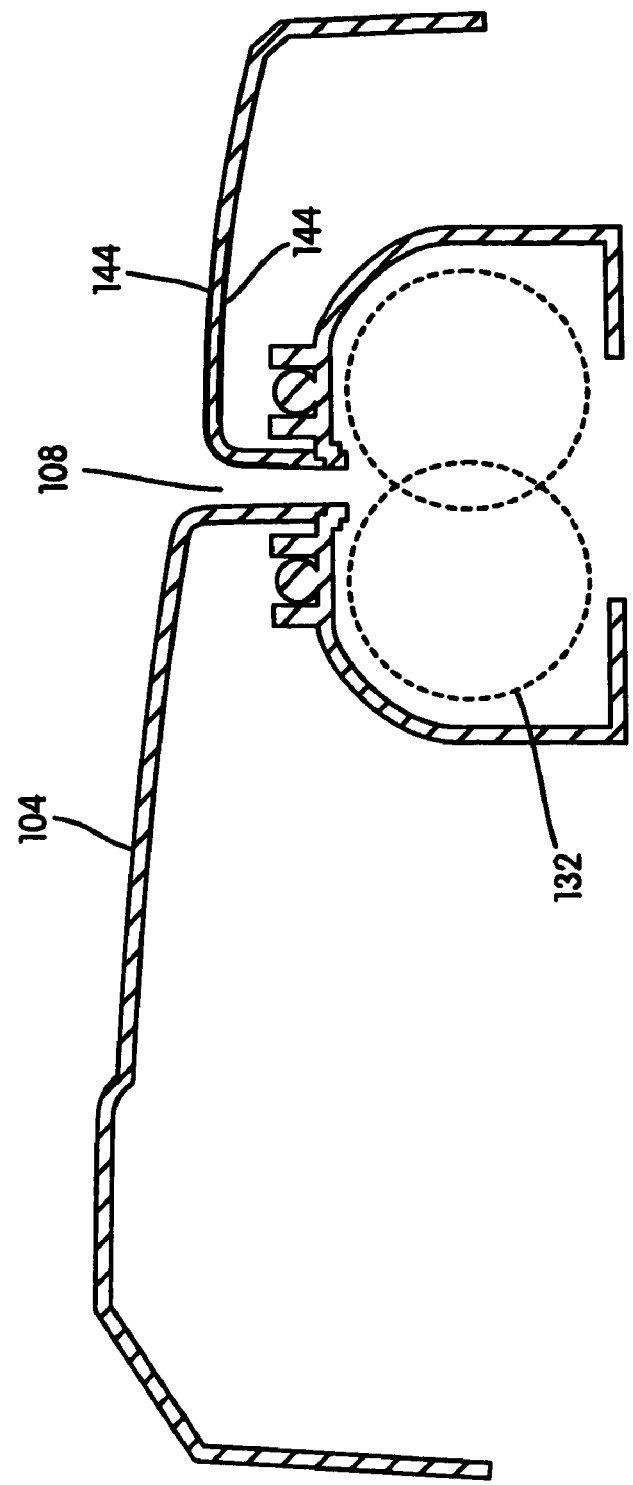

The conductor 144 of FIG. 6 includes two conductive portions respectively affixed to outside and inside surface portions of the housing 104. Such use of multiple portions increases the surface area of the capacitor, as well as the capacitive coupling, capacitance, and signal level produced when a person or thing nears the conductive portions.

Figure 7:
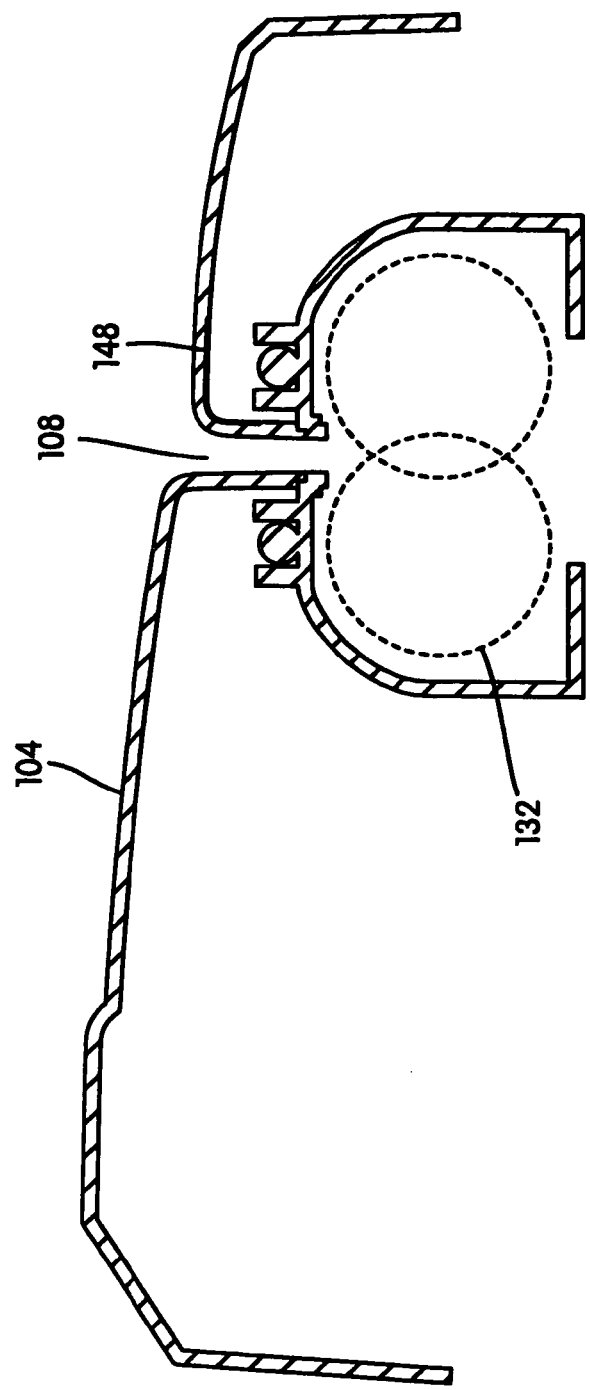

The conductor 148 of FIG. 7 comprises a conductive material on an inside surface portion of the housing 104. This is desirable for concealing the conductor 148 without adding the manufacturing step of embedding the conductor in a housing wall, such as is shown in FIG. 4. It is to be appreciated that the conductors of FIGS. 4-7 may be of any suitable configuration, and the examples illustrated are in no way intended to be limiting.

Figure 8:
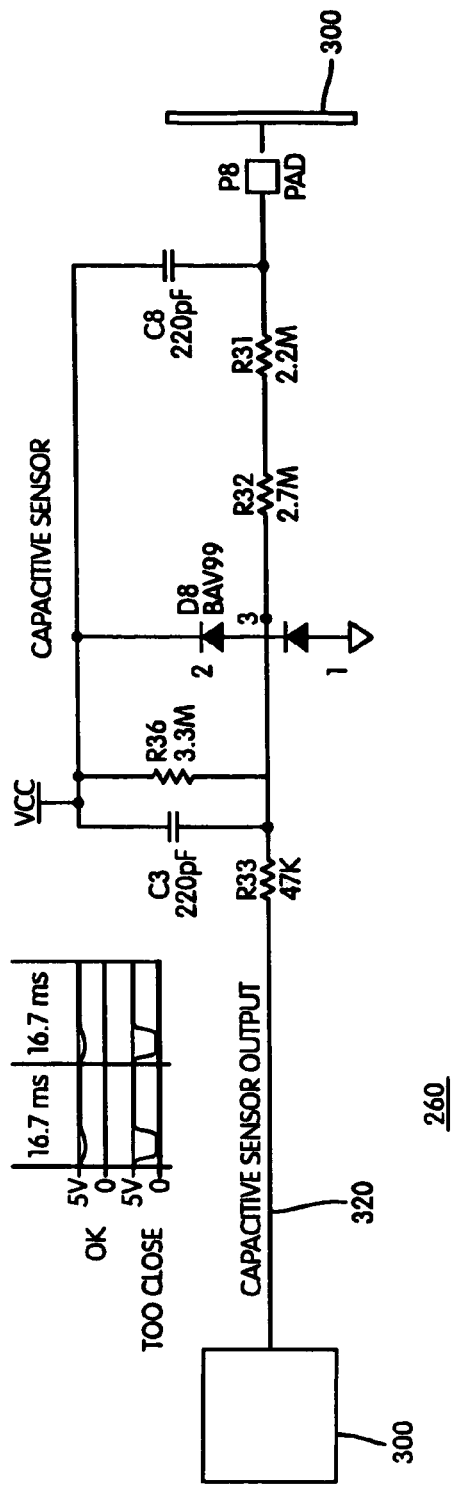
FIGS. 8 and 9 illustrate example capacitive sensor circuits according to respective embodiments of the present invention.
Figure 9:
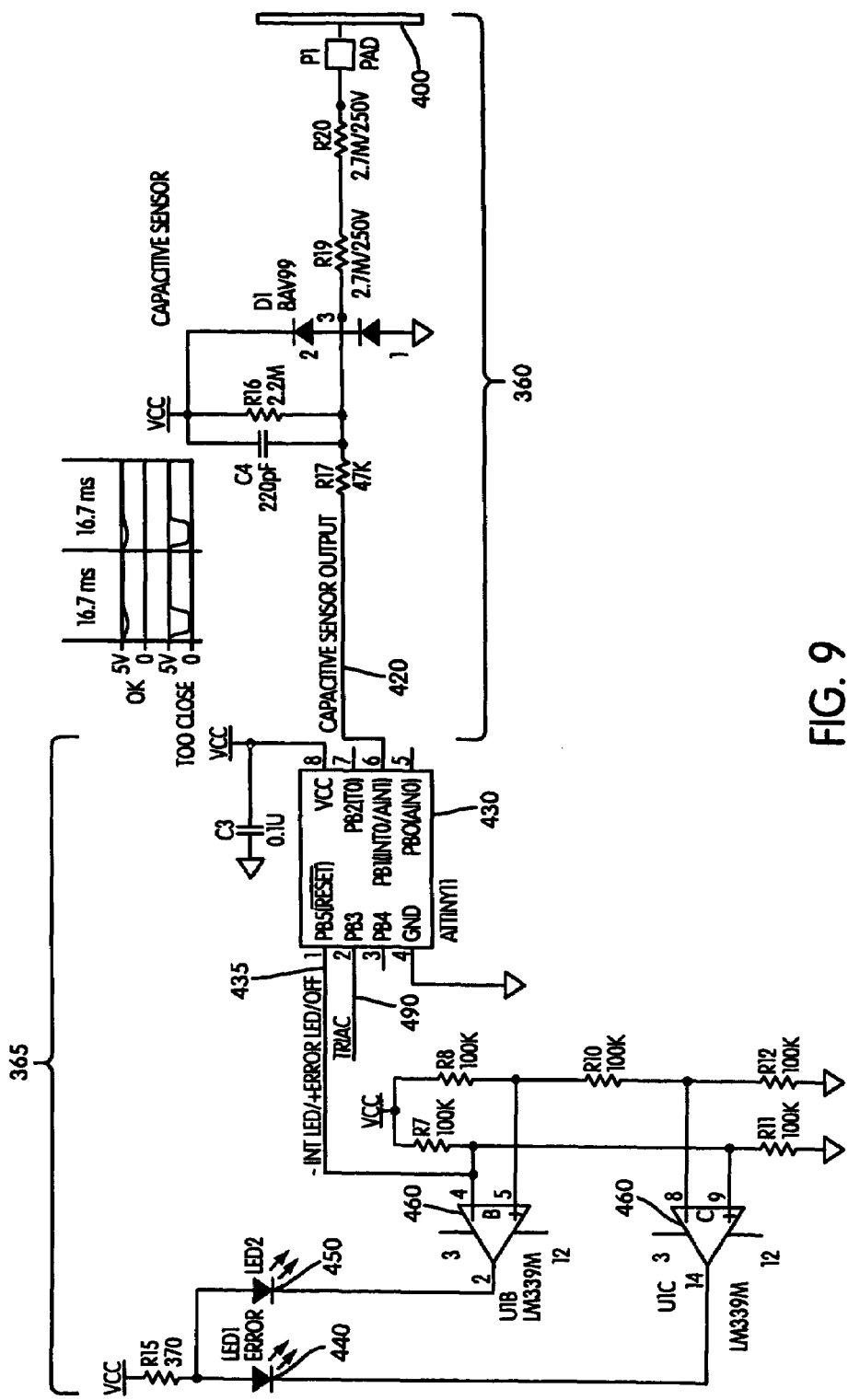

A conductor or conductive material such as described above in connection with FIGS. 3-7 is typically connected to circuitry on a circuit board. FIGS. 8 and 9 illustrate example capacitive sensor circuits according to respective embodiments of the present invention. The example circuits may be incorporated into the overall circuit design of a shredder, and are in no way intended to be limiting.

In FIG. 8, the capacitive sensor circuit 260 includes a conductor 300 that can have a configuration such as shown above or another suitable configuration. The conductor 300 is connected to a pad P8, which is in turn connected to circuit loops including capacitors C8 and C9, resistors R31, R32, and R36, and a high-speed double diode D8. The loops are connected to a voltage supply Vcc, circuit ground, and a resistor R33. The voltage supply Vcc is connected to the AC line voltage of the shredder, and a negative regulator can generate −5 volts for the circuit ground. The capacitive sensor output 320 may be in turn coupled as an input to a controller 330, such as a microprocessor or discrete circuit components (e.g., comparators, transistors), which takes appropriate action in response to signal levels at the output 320. Such a controller 330 may also be a relay switch that opens to disable the delivery of power to an element (e.g., the motor of the shredder mechanism) and closes to enable the delivery of power. It is to be appreciated that "controller" is a generic structural term that denotes structure(s) that control one or more modules, devices, and/or circuit components.

The principles of operation of the circuit 260 will be readily understood by those conversant with the art. When a person or thing moves close to the conductor 300, the increased capacitance therebetween causes the amplitude of the sinusoidal waveform at the output 320 to increase by a voltage sufficient to indicate the presence of the person or thing. Based on the increased signal level, the controller 330 can, for example, disable the cutting elements of the shredder, illuminate a sensor or error light, and/or activate an audible alert.

FIG. 9 illustrates a capacitive sensor circuit 360, as well as control and illumination circuitry 365. The capacitive sensor circuit 360 includes a conductor 400 that can have a configuration such as shown above or another suitable configuration. The conductor 400 is connected to a pad P1, which is in turn connected to series resistors R19 and R20. The resistor R19 is connected to circuit loops including a capacitor C4, a resistor R16, and a high-speed double diode D1. The loops are connected to a voltage supply Vcc, circuit ground, and a resistor R17. The voltage supply Vcc is connected to the AC line voltage of the shredder, and a negative regulator can generate −5 volts for the circuit ground. The capacitive sensor output 420 is coupled as an input to a controller 430, which can be, for example, a simple analog circuit or an ATtiny11 8-bit microcontroller offered by Atmel Corporation (San Jose, Calif.).

The principles of operation of the circuitry of FIG. 9 will be readily understood by those conversant with the art. When a person or thing moves close to the conductor 400, the increased capacitance therebetween causes the amplitude of the sinusoidal waveform at the output 420 to increase by a voltage sufficient to indicate the presence of the person or thing. Based on the increased signal level, the controller 430 sends appropriate control signals. For example, the controller 430 sends a control signal 490 to cut off power (such as supplied by a triac) to the motor that drives the cutting elements of the shredder, and a control signal 435 to illuminate a sensor LED 450 or error LED 440 coupled to comparators 460.

Embodiments of the present invention may be incorporated, for instance, in a shredder such as the PS80C-2 shredder of Fellowes, Inc. (Itasca, Ill.). If desired, existing shredder designs may be adapted, without major modification of existing modules, to incorporate proximity sensing circuitry.

In another embodiment of the invention, a shredder can provide two or more sensitivity settings for proximity sensing. The settings can be selectably enabled by a user and tailored to detect, e.g., infants or pets. In an example embodiment employing a capacitive sensor, objects are distinguished based on load times. A smaller capacitive load results in a shorter load time than a large capacitance. Thus, by measuring (e.g., with a microprocessor) differences in load times resulting from capacitive loads near a sensor, various objects can be distinguished.

In yet another embodiment of the invention, a mechanical switch or another type of detector is used to detect insertion of a foreign object. When the mechanical switch is actuated, the shredder blades are shut off, stopping the shredding operation (or some other operation is performed). In general, objects that are appropriate for shredding are thin and flat, e.g., paper, CDs, disks, credit cards and the like. Human and animal body parts, on the other hand are generally thicker. As a result, insertion of a body part into a shredder opening will result in pressure against the sides of the opening. For an opening having angled sides, this pressure will include both a component in the direction in which articles are fed through the opening (typically vertical) and a component perpendicular to the feed direction (typically horizontal). By allowing for some relative movement of the throat plate, this pressure may be used to actuate the mechanical switch. By appropriate selection of the size of the opening and the throw distance of the switch (or, when another type of detector such as an optical switch or a strain gauge is used, the sensitivity or active detection region), the shredder can be designed not to allow any object greater than a predetermined size (e.g., the size of a human finger, the size of a stack of paper too large for the shredder to handle) to enter the shredder throat without actuating the switch. This arrangement can also be used to prevent a user from inserting overly thick stacks of documents or other articles that could jam the shredder mechanism.

FIGS. 10a and 10b, illustrate a first embodiment of a mechanical switch for use in a shredder. As shown in FIG. 10a, the shredder housing 104 includes an opening 108. The walls 150 of the opening 108 are moveable parts that form a throat plate that is moveable relative to the shredder housing 104. Each of these walls 150 has an upper portion mounted against a pressure sensitive switch 152 which may be, for example, a foil switch. The mechanical switch may have, for example, an open state and a closed state, which may otherwise be considered as an on position or an off position.

In a particular embodiment, the foil switch includes an upward biasing member (not separately illustrated) that tends to maintain the switch in an open position, as well as to bias the walls 150 of the opening 108 in their upper position. As illustrated each wall 150 is independently moveable and each has an associated switch 152, however as will be appreciated, the symmetrical arrangement is not required and either one or both of the walls may have an associated switch or detector. Likewise, the walls need not be independently moveable and may move together.

While FIG. 10a illustrates the open position of the switch, FIG. 10b illustrates what happens when a relatively large object is inserted into the opening 108. As an object (schematically illustrated by the arrow) is inserted into the opening 108, it presses against the walls 150, and moves them downwardly, compressing the foil switch 152. This action completes a circuit that shuts off the cutting blades. Such a system has the further potential to reduce damage to the shredder caused by oversize objects becoming partially lodged in the opening, placing a strain on the cutter motors.

FIG. 11a illustrates another alternate embodiment of the invention. In this embodiment, the walls 150 of the opening include plunger portions 154. The plunger portions 154 extend through apertures 156 in the shredder housing 104. The plunger portions 154 are biased upward by a corresponding spring 158, maintaining the walls 150 in their upper position.

When a large object is inserted into the opening 108 as illustrated in FIG. 11b, the walls 150 are pressed downward and the plunger portions 154 come into contact with a mechanical switch 160. In the illustration, the switch 160 is a lever-type switch, however as will be apparent to one of ordinary skill in the art, a foil switch or other mechanical switch could be substituted. Likewise, a strain gauge to measure deflection of a structure could be used or an optical sensor for detecting the position of the walls 150 or other structure could be used. Generally, any suitable type of detector may be used.

The embodiments of FIGS. 10a, 10b, 11a and 11b each rely generally on downward pressure of the throat plate to actuate the switch that ends the shredding operation. As noted above, the pressure of a large object inserted into the angled walls of the opening will tend to have a horizontal component as well. Thus, a pressure plate that is sensitive to outward movement of the walls of the throat plate would also be suitable for use in embodiments of the present invention. Likewise, though the embodiments of FIGS. 10a, 10b, 11a and 11b are described in terms of automatically stopping the cutting blades, in one alternate configuration, activating the switch could cause a warning indicator such as a light or sound to be activated. Any such predetermined safety operation could be used.

As another alternative, the lower portion of one or both the walls 150 could be resiliently deflectable. This could be done by, for example, by pivotally connecting a relatively rigid member so that it pushes against a spring or by making the lever portion from a resiliently deflectable material. A detector, such as a mechanical switch or any other suitable detector could be used to determine when the respective wall 150 has flexed outwardly to a certain extent. This would indicate that an article of greater than a predetermined thickness has been inserted into the opening. Then, a predetermined operation (e.g., shutting off the shredding mechanism, emitting a warning signal) can be performed.

Figure 12:
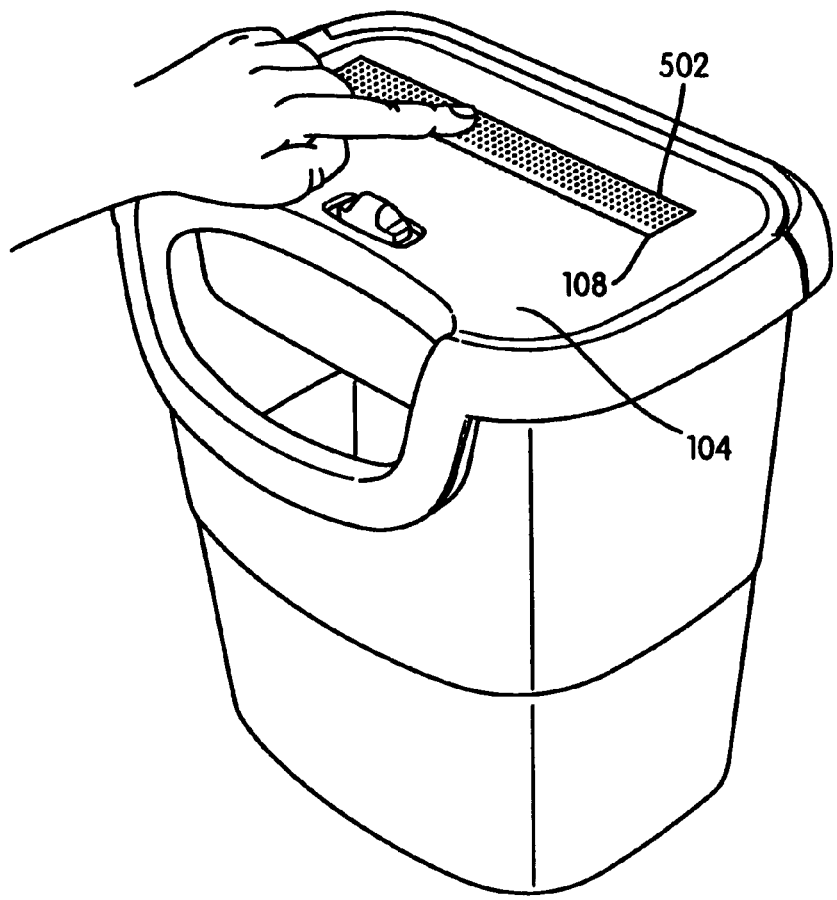
FIGS. 12 and 12a are illustrations of a shredder constructed in accordance with an additional embodiment of the present invention.
Figure 12A:
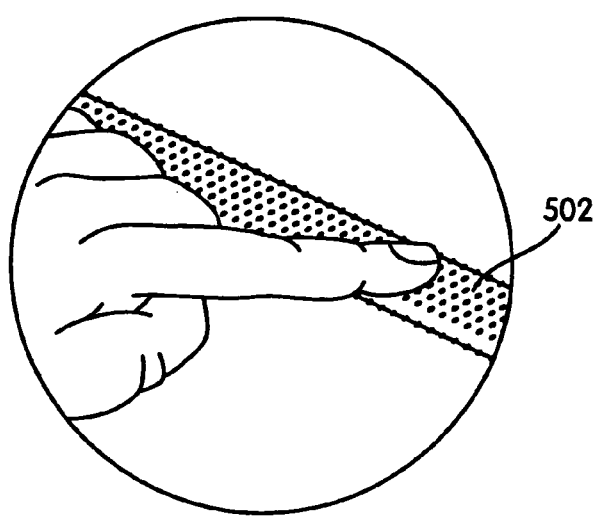

FIG. 12 illustrates an additional embodiment of a switch in accordance with the present invention, and FIG. 12a is a magnified view isolating the switch portion. The structure of the embodiment of FIG. 12 is similar to that of the embodiment of FIG. 3. A switch 502 is affixed to the housing 104 near to the opening 108. The switch is configured to sense contact by a change in resistance, for example as a result of contact with the switch by a person's hand.

Figures 13, 14:
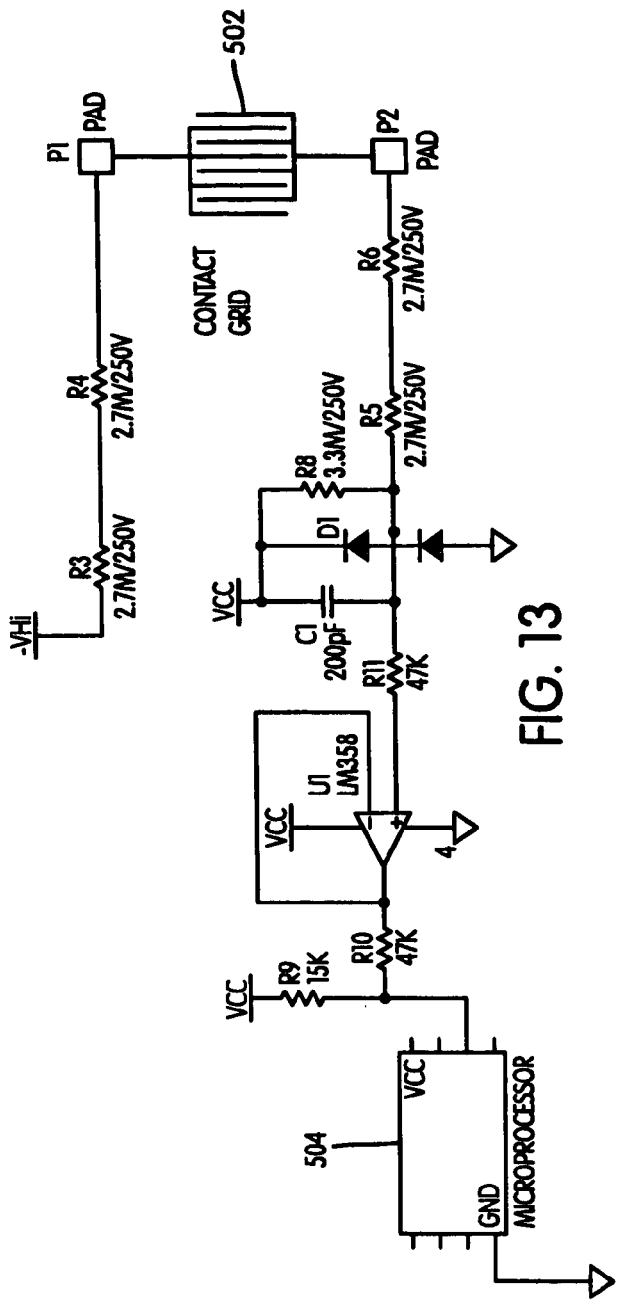
FIG. 13 is a schematic diagram of an example of an electronic circuit for controlling the operation of a shredder in accordance with the embodiment of FIG. 12.
FIG. 14 is a schematic diagram of an electrical connection used in an embodiment of the present invention configured for retrofitting to an existing shredder.

In one example, the switch includes a conductive grid, separated into two mutually adjacent conductors, this embodiment is represented schematically in FIG. 13 along with a control circuit. In a particular implementation, VHi is set to be nominally 20V less than Vcc. Pads P1 and P2 provide connectivity to the remainder of the circuit. The resistors R3-R6 are selected to have a large resistance, thereby limiting the current flowing through the circuit when activated. When a user's hand comes into contact with the grid, the circuit is completed and a current flows. The amplifier U1A (which may be, by way of example, an LM358, available from National Semiconductor), buffers the analog voltage produced, and passes it to an analog input of the microprocessor 504. The resistors R8, R9, R10 can be varied in order to change a sensitivity of the system, as desired.

The microprocessor can be selected to control the shredder in response to the signal from the amplifier U1A. In particular, the microprocessor can be set to control, for example, a triac that in turn controls the power to the shredder motor so that the blades stop when the switch 502 is contacted. Further, as noted above, a warning light or LED may be activated to inform the user why the motor has been deactivated.

Because the total resistance of the switch grid 502 can change, for example due to build up of dirt, the signal level can vary. Likewise, a user with moist fingers will provide less resistance than one with dry fingers, etc. Therefore, in one embodiment, the shredder's control software can include routines for monitoring nominal resistance over time, and adjust a threshold accordingly. Similarly, one embodiment of the present invention allows for monitoring a change in the signal rather than a strength of the signal, thereby discriminating between a slow build-up of dirt and a transitory contact. Finally, in one embodiment, as the measured nominal resistance falls below a predetermined level, an indicator, e.g., an LED, can be used to inform the user that the grid should be cleaned.

In another alternate embodiment, the switch may be a retrofit device. As shown schematically in FIG. 14, the retrofit device is interposed between the shredder and the power supply. The shredder is plugged into a controller rather than directly into a wall power supply. During normal operation, the retrofit device acts as a pass-through for power from the wall outlet to the shredder, and the shredder will operate substantially as it does when normally plugged into the wall. However, when the switch is activated, a controller, which may be, for example, similar to the one illustrated in FIG. 13, can cut off power to the shredder and/or provide an indication of a fault condition.

Figure 15:
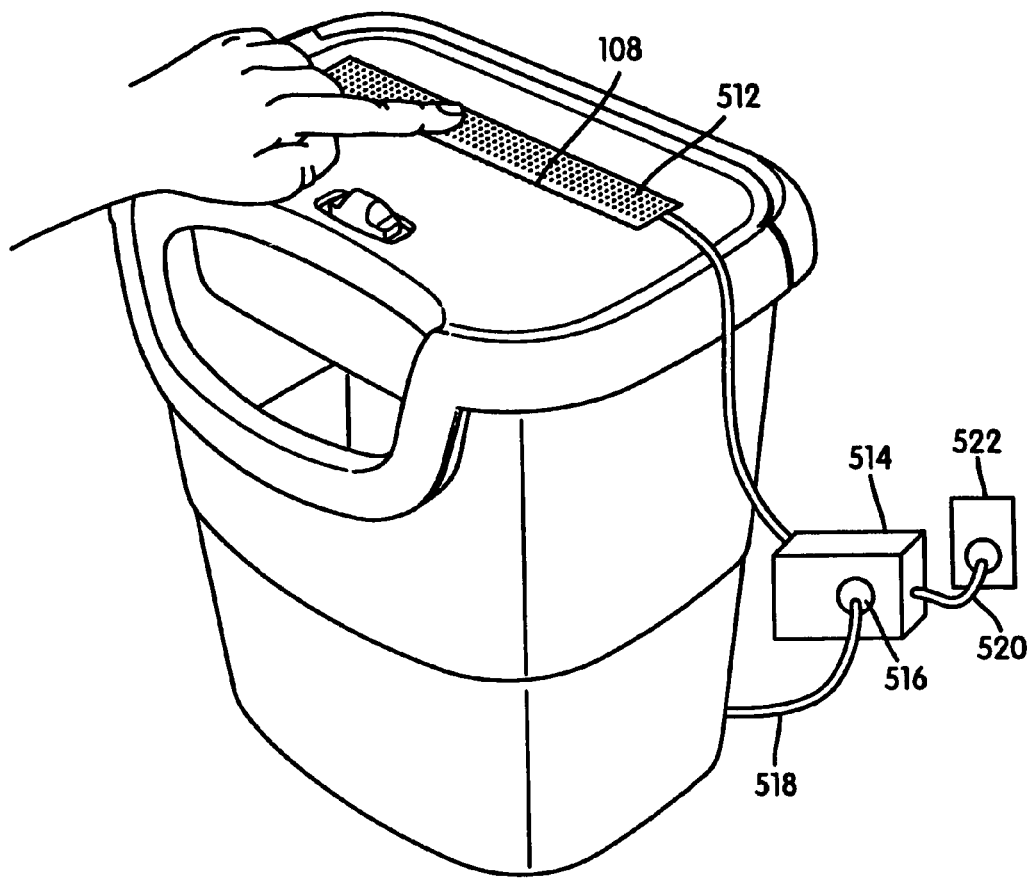
FIGS. 15 and 15a are illustrations of a retrofit embodiment of the present invention.
Figure 15A:
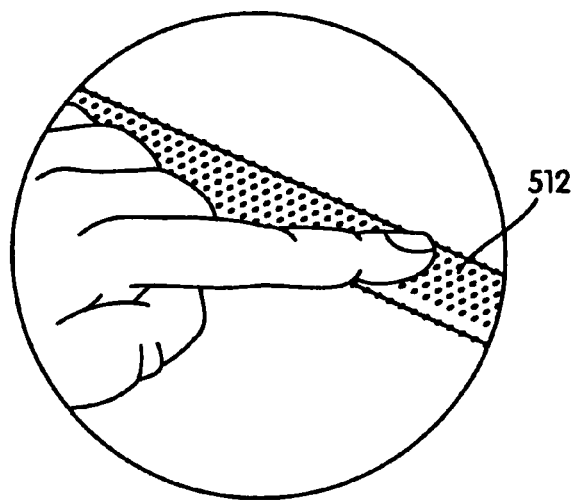

As illustrated in FIGS. 15 and 15a, the retrofit switch 512 itself may be a resistance sensitive switch, a capacitance sensitive switch or a pressure sensitive switch such as a membrane or foil switch, for example. The switch is affixed, permanently or removably, by use of an adhesive or a fastener to a position proximate the opening 108. It is electrically connected to a controller 514 which may be entirely separate, or may simply be a small package that can be affixed to the shredder housing. As noted above, the controller includes a receptacle 516 for the power cord 518 of the shredder, and will generally include its own power cord 520 for engaging a wall outlet 522 or other power source.

Although various illustrated embodiments herein employ particular sensors, it is to be noted that other approaches may be employed to detect the presence of a person or thing near a shredder, such as, for example, approaches utilizing eddy current, inductive, photoelectric, ultrasonic, Hall effect, or infrared proximity sensor technologies.

The foregoing illustrated embodiments have been provided to illustrate the structural and functional principles of the present invention and are not intended to be limiting. To the contrary, the present invention is intended to encompass all modifications, alterations and substitutions within the spirit and scope of the appended claims.

What is claimed is:

1. A document shredder for shredding one or more data bearing documents selected from the group consisting of paper, optical discs, and floppy disks, comprising:
    a housing;
    a document shredder mechanism received in the housing and including an electrically powered motor and cutter elements, the document shredder mechanism enabling one or more data bearing documents selected from the group consisting of paper, optical discs, and floppy disks to be fed into the cutter elements and the motor being operable to drive the cutter elements so that the cutter elements shred the one or more documents fed therein;
    the housing having a narrow, elongated opening enabling the one or more data bearing documents to be fed therethrough into the cutter elements of the document shredder mechanism for shredding;
    a discriminating sensor comprising an electroconductive sensor element at least in part adjacent the opening, said electroconductive sensor element being positioned between opposing longitudinal ends of the opening and extending in a longitudinal direction of the narrow, elongated opening to provide sensor coverage along essentially the entire length of the opening, the sensor being configured to indicate a presence of a person or animal, but not a presence of the one or more data bearing documents, in proximity to the opening based on the detection via the sensor element of an inherent electrical characteristic of the person or animal; and a controller operable to disable the cutter elements responsive to the indicated presence of the person or animal.

2. A shredder according to claim 1, wherein the cutter elements are disabled by disabling power to the motor responsive to the indicated presence of the person or animal.

3. A shredder according to claim 2, wherein the sensor is a contact sensor configured to indicate the presence of the person or the animal in proximity to the opening by detecting the inherent electrical characteristic of the person or the animal upon contact with the electroconductive sensor element.

4. A shredder according to claim 2, wherein the electroconductive sensor element extends adjacent the opening along an entire length of the opening.

5. A shredder according to claim 2, wherein the electroconductive sensor element is one electrode of a capacitor and wherein the sensor is configured to detect a mutual capacitance between the electroconductive sensor element and the person or animal.

6. A shredder according to claim 1, wherein the sensor is a capacitive sensor for detecting a capacitance between the sensor element and the person or animal.

7. A shredder according to claim 6, wherein:
the sensor further comprises circuitry to sense a state of the electroconductive sensor element.

8. A shredder according to claim 7, wherein the electroconductive element is a thin metal member extending along a portion of the housing adjacent the opening.

9. A shredder according to claim 8, wherein the metal member is at least in part covered by a non-conductive member.

10. A shredder according to claim 7, wherein the electroconductive element at least in part comprises metal paint applied to a portion of the housing or to a member associated with the housing.

11. A shredder according to claim 7, wherein the electroconductive element includes at least two metal members each extending along a portion of the housing adjacent the opening.

12. A shredder according to claim 7, wherein the cutter elements are disabled by disabling power to the motor responsive to the indicated presence of the person or animal.

13. A shredder according to claim 1, wherein the elongated, narrow opening is defined by a pair of opposing walls, and wherein the sensor element of the sensor is attached to at least one of the walls.

14. A shredder according to claim 1, wherein:
wherein the sensor further comprises circuitry to sense a state of the electroconductive sensor element.

15. A shredder according to claim 1, wherein the sensor is configured to indicate the presence of the person or the animal in proximity to the opening without requiring contact with the sensor element.

16. A shredder according to claim 1, further comprising a waste bin configured to receive shredded documents from the document shredder mechanism.

17. A shredder according to claim 16, wherein the waste bin is beneath the document shredder mechanism, the waste being manually removable from beneath the document shredder mechanism for emptying of the shredded documents therein.

18. A shredder according to claim 1, wherein the sensor is a resistive sensor.

19. A shredder according to claim 1, wherein the sensor is a contact sensor configured to indicate the presence of the person or the animal in proximity to the opening by detecting the inherent electrical characteristic of the person or the animal upon contact with the electroconductive sensor element.

20. A shredder according to claim 1, wherein the electro conductive sensor element extends adjacent the opening along an entire length of the opening.

21. A shredder according to claim 1, wherein the electroconductive sensor element is one electrode of a capacitor and wherein the sensor is configured to detect a mutual capacitance between the electroconductive sensor element and the person or animal.

22. A shredder according to claim 1, wherein the electro conductive sensor element is elongated in the longitudinal direction of the elongated opening.

23. A shredder according to claim 1, wherein the electroconductive sensor element extends adjacent the opening along an entire elongated length of the elongated opening.

24. A shredder according to claim 1, wherein the electroconductive sensor element consists of a single electrode of a capacitor and wherein the sensor is configured to detect a mutual capacitance between the single electroconductive sensor element and the person or animal.

25. A shredder according to claim 1, wherein:
the narrow, elongated opening is defined by a pair of opposing walls;
the electroconductive sensor element of the discriminating sensor is attached to at least one of the walls;
the electroconductive sensor element of the discriminating sensor extends along the at least one of the walls for essentially an entire length of the opening;
the electroconductive sensor element is provided on an external surface of the at least one of the walls and thereby defines the opening at least in part;
the electroconductive sensor element is one electrode of a capacitor;
the sensor is configured to detect a mutual capacitance between the electroconductive sensor element and the person or animal; and
the at least one of the walls and the electroconductive sensor element of the discriminating sensor curve toward the cutter elements as they progress into the opening toward the cutter elements.

26. A document shredder for shredding one or more data bearing documents, comprising:
a housing;
a document shredder mechanism received in the housing and including an electrically powered motor and cutter elements, the document shredder mechanism enabling one or more data bearing documents to be fed into the cutter elements and the motor being operable to drive the cutter elements so that the cutter elements shred the one or more documents fed therein;
the housing having a narrow, elongated opening enabling the one or more data bearing documents to be fed therethrough into the cutter elements of the document shredder mechanism for shredding;
a sensor comprising an electroconductive sensor element at least in part adjacent the opening, said electroconductive sensor element being positioned between opposing longitudinal ends of the opening and extending in a longitudinal direction of the narrow, elongated opening to provide sensor coverage along essentially the entire length of the opening, the sensor being configured to detect via the sensor element an inherent electrical characteristic of an object in proximity to the opening; and a controller operable to disable the cutter elements responsive to detecting the inherent electrical characteristic as reaching a predetermined threshold.

27. A shredder according to claim 26, wherein the cutter elements are disabled by disabling power to the motor responsive to the indicated presence of the person or animal.

28. A shredder according to claim 27, wherein the sensor is a contact sensor configured to detect the inherent electrical characteristic of the object upon contact with the electroconductive sensor element.

29. A shredder according to claim 27, wherein the electroconductive sensor element extends adjacent the opening along an entire length of the opening.

30. A shredder according to claim 27, wherein the electroconductive sensor element is one electrode of a capacitor and wherein the sensor is configured to detect a mutual capacitance between the electroconductive sensor element and the person or animal.

31. A shredder according to claim 26, wherein the sensor is a capacitive sensor for detecting a capacitance between the sensor element and the person or animal.

32. A shredder according to claim 26, wherein the sensor is configured to detect the inherent electrical characteristic of the object without requiring contact with the sensor element.

33. A shredder according to claim 26, wherein the sensor is a contact sensor configured to detect the inherent electrical characteristic of the object upon contact with the electroconductive sensor element.

34. A shredder according to claim 26, wherein the electroconductive sensor element extends adjacent the opening along an entire length of the opening.

35. A shredder according to claim 26, wherein the electroconductive sensor element is one electrode of a capacitor and wherein the sensor is configured to detect a mutual capacitance between the electroconductive sensor element and the person or animal.

36. A shredder according to claim 26, wherein the electroconductive sensor element is elongated in the longitudinal direction of the elongated opening.

37. A shredder according to claim 26, wherein the electroconductive sensor element extends adjacent the opening along an entire elongated length of the elongated opening.

38. A shredder according to claim 26, wherein the electroconductive sensor element consists of a single electrode of a capacitor and wherein the sensor is configured to detect a mutual capacitance between the single electroconductive sensor element and the person or animal.

39. A shredder according to claim 26, wherein:
the narrow, elongated opening is defined by a pair of opposing walls;
the electroconductive sensor element of the sensor is attached to at least one of the walls;
the electroconductive sensor element of the sensor extends along the at least one of the walls for essentially an entire length of the opening;
the electro conductive sensor element is provided on an external surface of the at least one of the walls and thereby defines the opening at least in part;
the electroconductive sensor element is one electrode of a capacitor;
the sensor is configured to detect a mutual capacitance between the electroconductive sensor element and the person or animal; and
the at least one of the walls and the electroconductive sensor element of the sensor curve toward the cutter elements as they progress into the opening toward the cutter elements.

40. A shredder, comprising:
a housing;
a shredder mechanism received in the housing and including an electrically powered motor and cutter elements, the shredder mechanism enabling one or more articles to be fed into the cutter elements and the motor being operable to drive the cutter elements so that the cutter elements shred the articles fed therein;
the housing having a narrow, elongated opening enabling the one or more articles to be fed therethrough into the cutter elements of the shredder mechanism for shredding;
a sensor comprising an electroconductive sensor element at least in part adjacent the opening, said electroconductive sensor element being positioned between opposing longitudinal ends of the opening and extending in a longitudinal direction of the narrow, elongated opening to provide sensor coverage along essentially the entire length of the opening, the sensor being configured to detect via the sensor element an inherent electrical characteristic of an object in proximity to the opening; and
a controller operable to disable the cutter elements responsive to detecting the inherent electrical characteristic as reaching a predetermined threshold.

41. A shredder according to claim 40, wherein the cutter elements are disabled by disabling power to the motor responsive to the indicated presence of the person or animal.

42. A shredder according to claim 41, wherein the sensor is a contact sensor configured to detect the inherent electrical characteristic of the object upon contact with the electroconductive sensor element.

43. A shredder according to claim 41, wherein the electroconductive sensor element extends adjacent the opening along an entire length of the opening.

44. A shredder according to claim 41, wherein the electroconductive sensor element is one electrode of a capacitor and wherein the sensor is configured to detect a mutual capacitance between the electroconductive sensor element and the person or animal.

45. A shredder according to claim 40, wherein the sensor is a capacitive sensor for detecting a capacitance between the sensor element and the person or animal.

46. A shredder according to claim 40, wherein the sensor is configured to detect the inherent electrical characteristic of the object without requiring contact with the sensor element.

47. A shredder according to claim 40, wherein the sensor is a contact sensor configured to detect the inherent electrical characteristic of the object upon contact with the electroconductive sensor element.

48. A shredder according to claim 40, wherein the electroconductive sensor element extends adjacent the opening along an entire length of the opening.

49. A shredder according to claim 40, wherein the electroconductive sensor element is one electrode of a capacitor and wherein the sensor is configured to detect a mutual capacitance between the electroconductive sensor element and the person or animal.

50. A shredder according to claim 40, wherein the electroconductive sensor element is elongated in the longitudinal direction of the elongated opening.

51. A shredder according to claim 40, wherein the electroconductive sensor element extends adjacent the opening along an entire elongated length of the elongated opening.

52. A shredder according to claim 40, wherein the electroconductive sensor element consists of a single electrode of a capacitor and wherein the sensor is configured to detect a mutual capacitance between the single electroconductive sensor element and the person or animal.

53. A shredder according to claim 40, wherein:
the narrow, elongated opening is defined by a pair of opposing walls;
the electroconductive sensor element of the sensor is attached to at least one of the walls;
the electroconductive sensor element of the sensor extends along the at least one of the walls for essentially an entire length of the opening;
the electro conductive sensor element is provided on an external surface of the at least one of the walls and thereby defines the opening at least in part;
the electroconductive sensor element is one electrode of a capacitor;
the sensor is configured to detect a mutual capacitance between the electroconductive sensor element and the person or animal; and
the at least one of the walls and the electroconductive sensor element of the sensor curve toward the cutter elements as they progress into the opening toward the cutter elements.

* * * * *

UNITED STATES PATENT AND TRADEMARK OFFICE
CERTIFICATE OF CORRECTION

PATENT NO. : 7,661,614 B2  Page 1 of 1
APPLICATION NO. : 11/177480
DATED : February 16, 2010
INVENTOR(S) : Tai Hoon Kim Matlin et al.

It is certified that error appears in the above-identified patent and that said Letters Patent is hereby corrected as shown below:

On the title page, item (75) Inventors, add
--Eric Gach, Mount Prospect, IL (US)--.

Signed and Sealed this

Fourth Day of May, 2010

David J. Kappos
*Director of the United States Patent and Trademark Office*